(12) United States Patent
Jinks

(10) Patent No.: US 8,091,250 B1
(45) Date of Patent: Jan. 10, 2012

(54) TAPE MEASURE END-SECURING DEVICE

(76) Inventor: Edwin Paul Jinks, Napa, CA (US)

( * ) Notice: Subject to any disclaimer, the term of this patent is extended or adjusted under 35 U.S.C. 154(b) by 0 days.

(21) Appl. No.: 12/924,689

(22) Filed: Sep. 30, 2010

(51) Int. Cl.
*G01B 3/10* (2006.01)
(52) U.S. Cl. .......................................... 33/758
(58) Field of Classification Search .................... 33/758, 33/768, 770
See application file for complete search history.

(56) References Cited

U.S. PATENT DOCUMENTS

| | | | | |
|---|---|---|---|---|
| 6,173,505 | B1 * | 1/2001 | Munno | 33/768 |
| 6,935,045 | B2 * | 8/2005 | Cubbedge | 33/770 |
| 2011/0179662 | A1 * | 7/2011 | Donovan et al. | 33/758 |
| 2011/0203127 | A1 * | 8/2011 | Mayfield | 33/768 |

* cited by examinere

*Primary Examiner* — G. Bradley Bennett
(74) *Attorney, Agent, or Firm* — Risto A. Rinne, Jr.

(57) ABSTRACT

An apparatus for improving the speed, accuracy, and economy in obtaining linear measurements during construction includes a body that includes a pair of straddle members that span across a thickness dimension of any preferred type of dimension lumber, including wood and synthetic building materials. If desired, the apparatus is designed to straddle a width, rather than a thickness, dimension. A number of receiving locations, such as edges, slots, or recesses, are provided on the apparatus that each correspond with a particular relative position, edge, mark, end, or surface of the dimension lumber. Each receiving location is able to receive and retain an end of a tape measure. An adjustable thumb member is provided that pivots around a center shaft and is adjustable longitudinally to better secure the end of the tape measure. The retaining force provided by the thumb member is adjustable. A threaded rod, hole in the straddle member, and securing knob are optionally provided for better securing the apparatus to the dimension lumber.

17 Claims, 2 Drawing Sheets

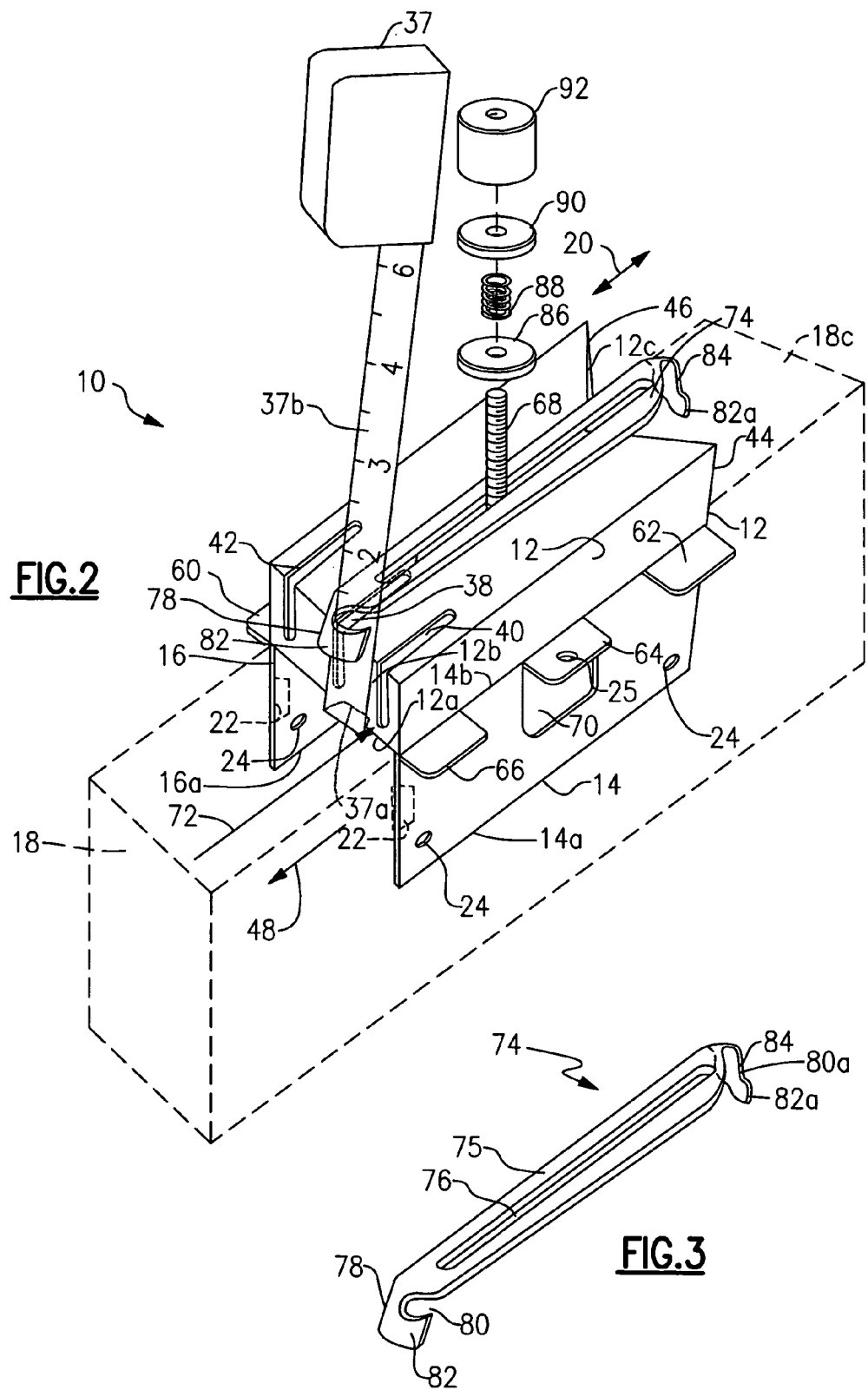

TAPE MEASURE END-SECURING DEVICE

BACKGROUND OF THE INVENTION

1. Field of the Invention

The present invention, in general, relates to the measurement of the length of an object and, more particularly, to devices that are used in combination with a tape measure.

In the various building construction arts the use of a tape measure is ubiquitous. Whether laying out forms for a foundation footing, preparing to pour a concrete slab, or erecting the walls, floors, ceiling, attic, and roof of a home or other type of building, various sizes of dimension lumber are commonly utilized depending on the specific task at hand. Each piece of dimension lumber is commonly referred to as a board and certain (specific) types of boards may also be referred to as "studs".

The dimension lumber boards are provided in a number of standard sizes where each standard size is cut during its manufacture to provide a known thickness and width. The dimension lumber boards are typically cut to a larger "rough" size of width and thickness. The board's four exterior surfaces are planed along the longitudinal length of the board. The board is then cut to a desired length to produce a finished dimensional lumber board. The various sizes of dimension lumber are commonly identified by the thickness and width dimensions of the "rough" board in combination with the overall finished length of the board.

For example, an especially common "size" of dimensional lumber that comes in various overall lengths is typically referred to as a "two by four" board or stud. This identification by size refers to a rough unfinished dimension of two inches in thickness and a rough unfinished dimension of four inches in width. As mentioned above for all dimension lumber, the two by four is planed to provide a smoother surface at a lesser thickness and width dimension.

Accordingly, the finished width and thickness of the finished two by four board (or stud) is reduced to approximately one and one-half inches in thickness and to approximately three and one-half inches in width. Most standard sizes of dimension lumber adhere to the above rule of thumb in that the finished size is usually approximately one-half of an inch less in both thickness and width than the "size" of the dimension lumber designates. While slight variations in the finished size occur between the various lumber mills the above estimates are typical and the instant invention, as described hereinafter, can be adapted to work with any finished size of dimension lumber.

Therefore, a "two by six" dimension lumber board typically includes a thickness of one and one-half inches and a width of five and one-half inches. Other common sizes of dimensional lumber that have a rough or unfinished thickness of two inches include two by two, two by three, two by eight, two by ten, and two by sixteen (inch) boards that are available in a variety of overall lengths. The finished width and thickness of these sizes of dimension lumber will also similarly be approximately one-half of an inch less than the stated or rough dimensional size.

Dimension lumber is also available in a rough thickness greater than two inches. For example, dimension lumber is also generally available with a rough thickness dimension of four, six, eight, and even twelve inches and in various width sizes. Dimension lumber that includes the same thickness and width are also commonly available. Examples of a few common (rough) sizes include four inches by four inches, six inches by six inches, eight inches by eight inches and, as mentioned above, two inches by two inches.

Each standard size of dimension lumber is usually provided in a variety of overall lengths. For example, eight, ten, twelve, sixteen, and twenty foot overall lengths are common for many dimension lumber sizes, as are shorter overall lengths also common for framing (i.e., the building of) interior walls and partitions.

Typically, the standard dimension lumber size (thickness and width) of the board is selected based to a large degree on the expected maximum working load that the dimension lumber will be required to support.

As used herein, dimension lumber refers to any type of building material or board that includes a predetermined (i.e., a standard or typical) thickness and is intended to include both wood-based types of lumber as well as synthetic types of lumber (i.e., non-wood types of lumber or lumber that is not formed entirely from wood). The dimensions of the tape measure end-securing device are modified to permit its use with any type of dimension lumber ranging in thickness from a fraction of an inch thick to any desired thickness (typically up to several or more inches thick).

Often, a desired overall length for a board (or group of boards) is other than the overall length choices that are available for most dimension lumber sizes. Therefore, the board (or boards) must be cut to size, meaning they must be cut to the desired overall length. During construction, care must be taken to ensure that each dimension lumber board is of the proper overall length before it is attached at the desired location of the structure.

If the board is longer than what is required it must be cut to the desired overall length. After the proper size (thickness and width) of each board (or identical group of boards) has been determined its desired overall length must also be determined. Then, all dimensions of the board will be known and it can be readied for its attachment to the structure. The desired overall length is obtained either by obtaining a measurement of the desired overall length directly off of (i.e., from) the partially completed structure that is being built or the overall length is provided in an engineering plan (i.e., specified in a drawing figure or shown in a list of materials).

Once the overall length of the dimension lumber is known each board (i.e., each piece) must be measured and marked to indicate the desired overall length. Usually, a tape measure is utilized for the measurement and a pencil mark is inscribed on each board to indicate its desired overall length. The excess material is then removed by cutting the board across its width at the location of the pencil mark. A skilled craftsman typically places the pencil mark at what is to become an edge after cutting. The craftsman then makes their saw cut across the width of the board so that an inside edge of the blade abuts the pencil mark. For less critical overall lengths less precision in making the cut is required.

Sometimes, the craftsman will need to make a straight cut extending directly across the width of the dimension lumber or an angular cut will be required extending across the width and also along some portion of the board's longitudinal length. Whenever a cut is required measurement and marking of the board is necessary to ensure that after cutting the board will be of the proper overall length or include the desired angle or any other preferred shape.

A standard rule or saying in the building construction art is to "measure twice and cut once". It is generally acknowledged that all sizes of dimension lumber are expensive. This saying aims to minimize errors and the waste of having to discard an improperly cut and ruined dimension lumber board. Clearly, a device capable of helping to provide accurate measurement of dimension lumber would be useful in reducing waste.

Most of the framing and general building construction is accomplished using standard two-inch rough thickness boards (actually one and one-half inches thick, when finished) that are selected from the available range of widths. As mentioned, they are then cut to any desired overall length, as needed.

As mentioned above, it is common practice to take a measurement beginning at a desired longitudinal end of the dimension lumber board and extending to a distal location along the longitudinal length of the board, where it is marked for cutting. It is also common practice to take a measurement from one edge or corner to another edge or corner. For example, a measurement taken from an inside corner of a concrete form to an opposite inside corner of the concrete form is compared with a second measurement that is taken across the two remaining and opposite inside corners to verify whether the form, as presently configured, is square. It is important that the foundation or slab is square before the concrete is poured.

When taking such measurements, it is difficult to maintain a free end of the tape measure consistently and repeatedly at an inside corner of a structure that is formed of dimension lumber.

Therefore, such measurements require two people to accomplish, with one person holding the exposed free end of the tape measure where desired at the inside corner while the other person walks over to the opposite corner and notes the distance to the opposite corner on the tape measure. This process is then repeated across the remaining corners and the two results are compared to ensure perpendicularity of the forms.

A first problem encountered is as previously mentioned, two people are required. The need for two people to take such types of measurements, and other lengthy measurements as well, increases the cost of construction.

Accordingly, there is a need to reduce the cost of building construction whenever possible.

A second problem is that the person who is holding the free end of the tape measure may not hold it in the same location relative to the inside corner for both measurements. This is because the exact location of the inside corner is, to some degree, based on the subjective opinion of the person as to where to hold the free end of the tape measure.

If while determining whether a structure is square (either a square or rectangular shape) two people cooperate to obtain a measurement taken across an opposite first pair of inside corners and the person who held the free end during that measurement does not hold the free end during measurement across an opposite remaining second pair of inside corners, the subjective aspect can cause a variation in measurements to occur when they are, in fact, the same or it can cause them to appear identical when, in fact, they are not equal.

Accordingly, there is a need for a fixed reference point for making inside corner to corner measurements as well as making measurements in general.

A third problem is that even if the person who is holding the free end of the tape measure is especially aware and diligent regarding their need to hold the free end in the same relative location for both measurements they may be unable to do so. This is because the other more distant person who is actually taking the measurement is holding the body of the tape measure and he (or she) may momentarily increase the force that is applied to the tape measure in order to eliminate slack or droop before taking the measurement.

This increased force may momentarily exceed the force that the person who is holding the free end of the tape is applying. This will cause the free end of the tape measure to pull away from the inside corner. The person holding the free end would then, in turn, automatically increase the resistive force they are offering in order to stop the free end from being urged even further away from the inside corner. He or she would then further increase the resistive force that is being applied to urge the free end of the tape measure back into the same relative inside corner location where it was previously being held.

However, the more distant person may have taken a measurement at anytime during this process including when the free end of the tape was disposed maximally away from the inside corner, thereby resulting in a false measurement reading. If the false reading falsely confirmed that the two corner-to-corner distances were equal, construction of a building that was not sufficiently perpendicular could result. If the false reading falsely confirmed that the two distances were unequal, additional and unnecessary work to correct the placement of the forms could result.

As the distances involved can vary considerably, ranging from a few feet to hundreds of feet distant from corner to corner, the force that needs to be applied to remove slack during measurement can vary considerably. This makes it even less likely that the person who is attempting to hold the free at the inside corner would be able to do so consistently.

Accordingly, a device and method for taking consistent inside (or outside) corner-to-corner diagonal measurements of the distances between rectangular areas as created by dimension lumber structures, or which can be effectively used by only one person, or which can provide an accurate reading over a reasonable range of variation to the force that is being applied to the body of a tape measure to remove slack or droop, is needed.

While it is desirable to measure from an inside (or outside) corner across to an opposite inside (or outside) corner thereby utilizing all four corners of the structure for measurement to determine how square it is, this is difficult to accomplish for the reasons mentioned above and especially so. as the corner-to-corner distances increase. Therefore, it is common practice during construction to measure along a first side of a rectangular corner (measuring from the outside of the corner) and place a mark along the first side at a multiple of 3 units of measurement (such as at 3 feet, 6 feet, or 9 feet, etc.) and to then measure and similarly place a mark along a remaining second side that includes a multiple of 4 units (such as 4 feet, 8 feet, 12 feet, etc.).

It is common knowledge in the building construction arts that a right-angle triangle that includes a first side which is a multiple of three units and a second side that is a corresponding next multiple of four units will also include a hypotenuse that is a corresponding next multiple of five units. Therefore, after marking the two right angle sides a measurement is then taken between the two marks along the hypotenuse to verify that the hypotenuse includes a dimension that is a corresponding multiple of five units which ensures that the corner is a right angle.

However, this method relies on extrapolation and, therefore, is not as accurate as measuring from corner-to-corner diagonally across the area and comparing the two measurements to confirm that they are equal. Also, the "three, four, five right triangle" measurement only verifies that the one corner that has been measured is reasonably close to perpendicular. Therefore, the process would require repeating at each of the four corners to ensure that all four corners are perpendicular.

Accordingly, the "three, four, five right triangle" measurement approach is less accurate and more time consuming than measuring diagonally from corner-to-corner. It is also accomplished in lieu of the more desirable corner-to-corner diagonal comparison because it may be possible for a single operator (person) to retain the free end of the tape measure at an outside corner when the mark along each side is to be placed only a short distance from the corner, such as from about three up to about twelve feet, whereas it would become considerably more difficult for the single operator to maintain the free end of the tape measure at the outside corner as the distances involved increase considerably.

However, the greater the distances that are used for even this type of measurement the greater will be the accuracy of the result. If the free end of the tape measure could be secured proximate an outside corner sufficient to allow any desired length of measurement by a single operator, an increase in accuracy of measurement when using the "three, four, five right triangle" method of determining perpendicularity would also be provided.

Accordingly, there is a need for a device that secures the free end of a tape measure proximate an outside corner and which allows a single operator to accurately measure and place a mark at a desired location along each of the sides of a right-angle corner where desired.

Similarly, there is a need for a device that can consistently secure the free end of a tape measure proximate one of the marks that was been made along a first of the sides, extend the tape measure to another of the marks on the remaining side, and accurately observe the distance between the two marks which is the hypotenuse.

Similarly, there are numerous other situations where it is desirable to secure the free end of the tape measure at a desired location in order to take a particular measurement. For example, it is desirable to measure from the center of the thickness of a first dimensional lumber piece to the center of the thickness of a second dimensional lumber piece that is parallel with the first piece and disposed away from the first piece. The spacing of dimensional lumber when framing walls, floors, ceilings, or roofs commonly include a standard spacing of either sixteen or twenty-four inches, however, other spacing dimensions are also possible. Therefore, there is a need for a device to secure the free end of a tape measure proximate a center of the thickness of dimensional lumber.

Similarly, there is a need for the taking of measurements of parallel spaced-apart dimensional lumber measuring from an outside edge of a first board to an outside edge of a second board, or when measuring from an outside edge of a first board to an inside edge of the second board or when measuring from an outside edge of a first board to a center location of the second board. There is also a need for taking measurements from the inside edge of the first board to either an inside, outside, or center location of the second board.

Accordingly, there is a need for a device that can secure the free end of a tape measure at an inside or outside edge when taking these and other types of dimension lumber measurements. Similarly, there is a need to secure the free end of a tape measure when taking measurements along a vertical dimension.

Also, prior art tape measuring devices are secured to dimension lumber by the use of a nail. The nail mars the wood. It also takes time to install and remove such a device. Therefore, it is not convenient to take measurements from numerous different starting points.

Accordingly, there is a need for a tape measure end-securing device that does not require the use of a nail to fasten it to the lumber when used with dimension lumber and which is readily moveable from one location to another.

There is a need for a tape measure end-securing device that automatically secures itself to dimension lumber sufficient to accomplish most measurements.

There is a need for a tape measure end-securing device that can be secured to dimension lumber without the use of a nail and which can secure the device in an inverted position.

Accordingly, there exists today a need for a tape measure end-securing device that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may belong-standing in nature, the instant invention further attests that the elements thereof, in combination as claimed, cannot be obvious in light of the teachings of the prior art to a person of ordinary creativity.

Clearly, such an apparatus would be useful and desirable.

2. Description of Prior Art

Tape measure attachment devices are, in general, known. For example, the following patent documents describe various types of these devices, some of which may have some degree of relevance to the invention. Other patent documents listed below may not have any significant relevance to the invention. The inclusion of these patent documents is not an admission that their teachings anticipate any aspect of the invention. Rather, their inclusion is intended to present a broad and diversified understanding regarding the current state of the art appertaining to either the field of the invention or possibly to other related or even distal fields of invention.

U.S. Pat. No. 7,487,600 to Cooper, that issued on Feb. 10, 2009;

U.S. Pat. No. 7,024,792 to Graham, that issued on Apr. 11, 2006;

U.S. Pat. No. 6,839,981 to Rafter, that issued on Jan. 11, 2005;

U.S. Pat. No. 6,663,153 to Brunson, that issued on Dec. 16, 2003;

U.S. Pat. No. 6,427,358 to LeBon et al., that issued on Aug. 6, 2002;

U.S. Pat. No. 6,295,739 to Kraft, that issued on Oct. 2, 2001;

U.S. Pat. No. 6,108,926 to Fraser et al., that issued on Aug. 29, 2000;

U.S. Pat. No. 5,481,813 to Templeton, that issued on Jan. 9, 1996;

U.S. Pat. No. 5,421,100 to Leore, that issued on Jun. 6, 1995;

U.S. Pat. No. 5,172,486 to Waldherr, that issued on Dec. 22, 1992;

U.S. Pat. No. 4,864,734 to Woodard et al., that issued on Sep. 12, 1989;

U.S. Pat. No. 4,353,167 to Martin, that issued on Oct. 12, 1982;

U.S. Pat. No. 3,662,471 to Lynde, that issued on May 16, 1972;

U.S. Pat. No. 3,145,477 to Morrison, that issued on Aug. 25, 1964;

U.S. Pat. No. 2,853,785 to Raifsnider, that issued on Sep. 30, 1958;

U.S. Pat. No. 756,633 to Herrick, that issued on Apr. 5, 1904; and including U.S. Design Patents:

U.S. Design Pat. No. D432,035 to Harris, that issued on Oct. 17, 2000; and

U.S. Design Pat. No. D249,128 to Stookey, that issued on Aug. 29, 1978.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a tape measure end-securing device that is able to secure a free end of a tape measure in a desired position with respect to dimension lumber.

It is also an important object of the invention to provide a tape measure end-securing device that permits measurements to be taken by only one person.

Another object of the invention is to provide a tape measure end-securing device that permits accurate measurements to be taken.

Still another object of the invention is to provide a tape measure end-securing device that permits accurate measurements to be taken over long distances.

Still yet another object of the invention is to provide a tape measure end-securing device that can measure from corner to corner, from center to center, from center to edge, from edge to center, and along longitudinal lengths of dimension lumber.

Yet another important object of the invention is to provide a tape measure end-securing device that can be secured where desired to dimension lumber.

Still yet another important object of the invention is to provide a tape measure end-securing device that does not need to be nailed to dimension lumber.

A first continuing object of the invention is to provide a tape measure end-securing device that can be readily moved from place to place on the dimension lumber.

A second continuing object of the invention is to provide a tape measure end-securing device that automatically secures itself to dimension lumber sufficiently to permit most types of measurements to be taken.

A third continuing object of the invention is to provide a tape measure end-securing device that includes a screw-thread adjustable clamp for securing it to dimension lumber when a considerable pulling force will be applied to a body of a tape measure.

A fourth continuing object of the invention is to provide a tape measure end-securing device that can lightly secures the free end of the tape measure to the device for relatively short measurements.

A fifth continuing object of the invention is to provide a tape measure end-securing device that can positively secure the free end of the tape measure to the device for relatively long measurements or when considerable force is applied to the body of the tape measure.

Briefly, a tape measure end-securing device that is constructed in accordance with the principles of the present invention has a body that straddles dimension lumber along a thickness dimension (for most types of dimension lumber) or a width dimension (if preferred). A number of receiving locations are provided on the device that correspond with a position, surface, side, end, or edge of the dimension lumber. Each of the receiving locations is capable of receiving and securing an end of a tape measure. A pivoting, longitudinally adjustable thumb member is provided that can be optionally used for further securing the end of the tape measure. The force applied to the end of the tape measure by the thumb member is adjustable. A threaded clamp assembly consisting of a securing knob attached to a threaded rod that passes through an opening in the device is optionally provided for better securing the device, when desired, in a preferred relative position with respect to the dimension lumber.

BRIEF DESCRIPTION OF THE DRAWINGS

FIG. 2 is a view in perspective of an opposite end of the tape measure end-securing device of FIG. 1 with a tape measure end secured to a different location of the device and also showing, in exploded view, a thumb member securing knob assembly.

FIG. 3 is an enlarged view in perspective of a thumb member of FIG. 1.

DETAILED DESCRIPTION OF THE INVENTION

Figure 1:
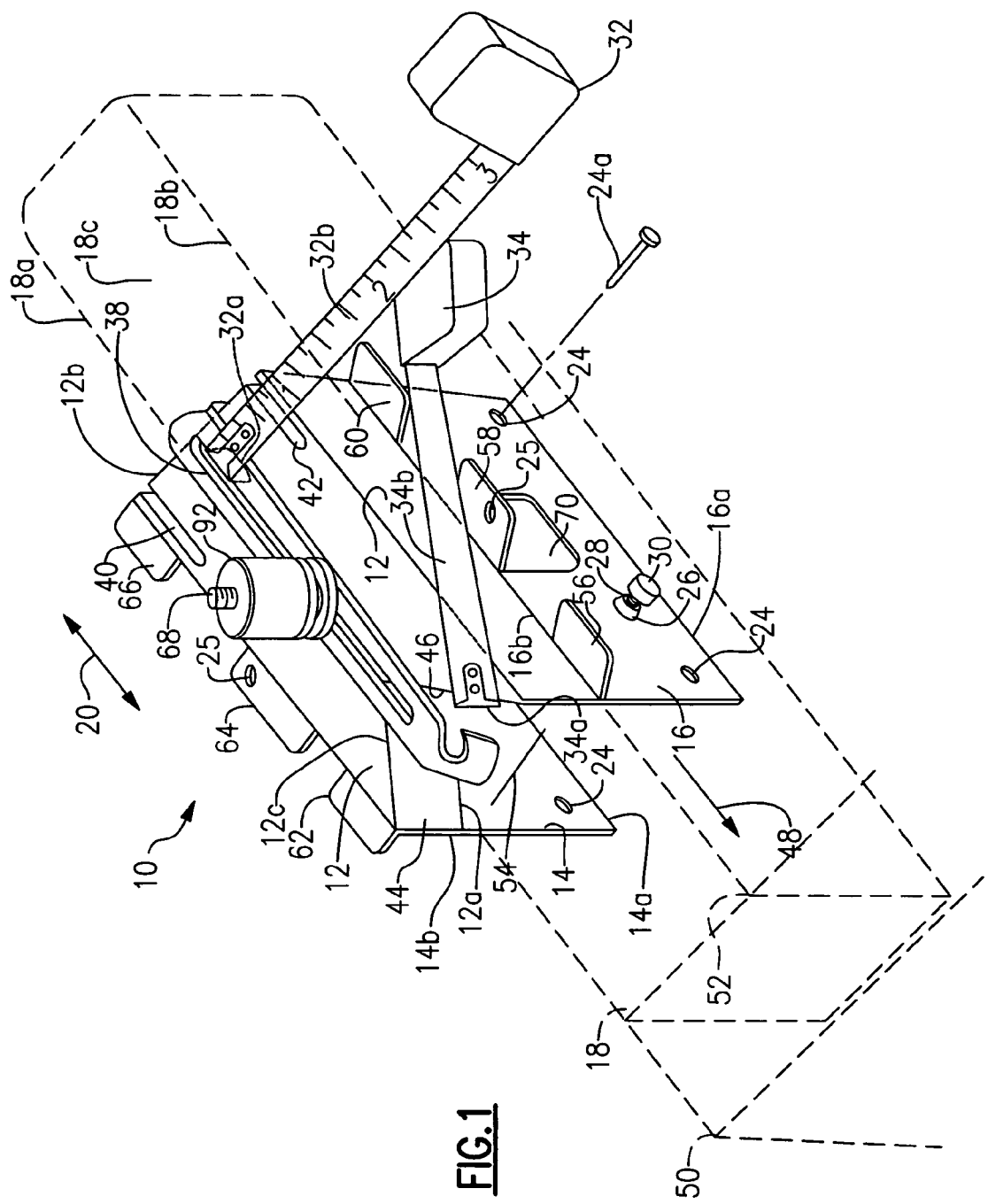
FIG. 1 is a view in perspective of a tape measure end-securing device disposed over a piece of dimension lumber shown in cooperation with the ends of two tape measures.

Referring on occasion to all of the FIGURE drawings and now, in particular to FIG. 1, is shown a tape measure end-securing device, identified in general, by the reference numeral 10.

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

The tape measure end-securing device 10 includes a body 12 that is approximately one-half of an inch thick and approximates two inches wide by three inches long, although any preferred size is possible depending on the size of the dimension lumber that the tape measure end-securing device 10 is designed for use with. The above approximate dimensions are for use with dimension lumber that includes a rough thickness dimension of two inches or a finished thickness dimension of approximately one and one-half inches. For other sizes of dimension lumber the dimensions of the tape measure end-securing device 10 are altered, as necessary to cooperate with the size of dimension lumber that the tape measure end-securing device 10 is designed to cooperate with.

The tape measure end-securing device 10 is formed of any preferred material including any desired type of plastic, metal, fiberglass, composite material, or any other suitable material.

Attached to opposite bottom outside edges of the body 12 of the tape measure end-securing device 10, a pair of straddle members 14, 16 extend downward a predetermined amount. The straddle members 14, 16 are preferably substantially planar members that are attached to the body 12 or molded as an integral an extending part of the body 12. The spacing between the straddle members 14, 16 is selected to cooperate with a desired dimension of dimension lumber or a board (partially shown in dashed lines and each identified hereinafter by the reference numeral 18).

For most applications of the tape measure end-securing device 10, the straddle members 14, 16 will include a spacing that is approximately equal to a finished thickness dimension of the board 18. For all dimension lumber 18 that includes a rough thickness of two inches, such as two by four, two by six, two by eight, two by ten, and two by twelve inch boards 18, the interior span between the straddle members 14, 16 will be approximately one and one-half inches.

For dimension lumber 18 that includes a rough thickness dimension of four inches the interior span between the straddle members 14, 16 will be approximately three and one-half inches. For dimension lumber boards 18 that includes a rough thickness dimension of six, eight, ten, and twelve inches the respective interior spans between the straddle members 14, 16 will be approximately five and one-half inches, seven and one-half inches, nine and one-half inches, and eleven and one-half inches to correspond with the finished thickness dimension of the various sizes of the boards 18.

During use, the straddle members 14, 16 of the tape measure end-securing device 10 are urged over an edge (i.e., a thickness) of the board 18 until a bottom surface 12*a* of the body 12 is disposed adjacent to the edge of the board 18. The straddle members 14, 16 each include a distal end 14*a*, 16*a* that is disposed maximally away from the body 12.

It is noted that the thickness dimension can vary slightly for the same sizes of dimension lumber 18 coming from different manufacturing lumber mills. This is because there may be a slight variation between the machine settings that produce the finished boards 18 from mill to mill. Therefore, it is preferred that the span between an interior of a pair of upper ends 14*b*, 16*b* of the straddle members 14, 16 be sufficient to accommodate the largest finished thickness dimension that is likely to occur with a given size of the dimension lumber boards 18 that are industry-compliant.

If desired, the distal ends 14*a*, 16*a* of the straddle members 14, 16 may be disposed closer toward each other than are the upper ends 14*b*, 16*b*. The straddle members 14, 16 are preferably formed of a thin planar material that includes some elasticity with respect to each of their lines of attachment to the body 12.

Accordingly, as the tape measure end-securing device 10 is urged over the edge of the board 18, the distal ends 14*a*, 16*a* of the straddle members 14, 16 may adjust for and accommodate the actual thickness dimension of the board 18 by deflecting outward slightly due to the slight elasticity of the straddle members 14, 16.

As desired, the straddle members 14, 16 may be parallel with respect to each other or they may be disposed a greater distance apart at the upper ends 14*b*, 16*b* and taper closer toward each other when moving away from the upper ends 14*b*, 16*b* and toward the distal ends 14*a*, 16*a*.

The spacing between the straddle members 14, 16 and any available elasticity applies a force to the distal ends 14*a*, 16*a* urging the distal ends 14*a*, 16*a* in a direction that is generally toward each other. This force increases friction between the distal ends 14*a*, 16*a* and helps retain the tape measure end-securing device 10 in position on the board 18 at the location where it was urged over the board 18. If the tape measure end-securing device 10 was not urged exactly where desired, a user (not shown) can grasp the tape measure end-securing device 10 and apply a sufficient force to urge the tape measure end-securing device 10 a desired amount in either direction as shown by arrow 20.

It is preferred, though not a requirement, that sufficient friction should arise between the straddle members 14, 16 and the board 18 to retain the tape measure end-securing device 10 in position with respect to the board 18 unless acted on by a sufficiently strong-enough force to displace it. If the board 18 is level, gravity will create friction between the bottom surface 12*a* and the edge of the board 18 which may be sufficient to retain the tape measure end-securing device 10 in a desired position until a particular measurement can be accomplished.

This would depend on the direction of measurement that is being made. If the tape measure end-securing device 10 is used for taking a center to center measurement between two of the boards 18, for example, (only one board 18 is shown) as shown by a first tape measure 32, then there may not arise a sufficient force to alter the position of the tape measure end-securing device 10 even if the tape measure end-securing device 10 were to fit over the board 18 somewhat loosely. In general, however, it is preferred that the tape measure end-securing device 10 include some means for securing it in a desired position and friction between the board 18 and any part of the tape measure end-securing device 10 is one of the available and often preferred means.

If desired, friction increasing members 22 (FIG. 2) can be included at any preferred location or locations to the inside surfaces of the straddle members 14, 16 to increase friction between the tape measure end-securing device 10 and the board 18, thereby providing another means for securing the tape measure end-securing device 10 to the board 18.

When a very long measurement is to be taken and considerable force will be applied to the tape measure end-securing device 10 by the user when taking the measurement the tape measure end-securing device 10 can be secured to the board 18 by driving one or more nails 24*a* through any of a plurality of nail holes 24 that are provided in the straddle members 14, 16 or elsewhere in the tape measure end-securing device 10. The nail holes 24 provide still another means for securing the tape measure end-securing device 10 at a desired location to the board 18.

If desired, a threaded opening 26 (similar to a nut) is provided on at least one of the straddle members 14, 16. A threaded rod 28 that is attached to a securing knob 30 passes through the threaded opening 26. The securing knob 30 is tightened when needed to secure the tape measure end-securing device 10 to a desired location of the board 18. A hole is provided through the straddle member 14, 16 directly under the threaded opening 26 for the threaded rod 28 to pass through and contact a surface of the board 18. The threaded opening 26, threaded rod 28, and securing knob 30 provide an alternative method for securing the tape measure end-securing device 10 to the board 18 when the tape measure end-securing device 10 will be subjected to strong forces during measurement that might tend to displace the location of the tape measure end-securing device 10 with respect to the board 18.

Preferably, the threaded rod 28 is prevented from separating from the threaded opening 26 by flattening some of the screw threads of the threaded rod 28 that have passed through the threaded opening 26 and which are distally disposed with respect to the securing knob 30. Therefore, the threaded rod 28 cannot easily be separated from the tape measure end-securing device 10. This ensures that a built-in method for attaching the tape measure end-securing device 10 to the board 18 is always available to the user. By way of contrast, it is possible for the user to forget to take any of the nails 24a or a hammer (not shown) may not be immediately available when using the tape measure end-securing device 10.

The tape measure end-securing device 10 provides versatility in taking a measurement in any direction from the board 18. It includes recesses and other shapes that naturally tend to retain an end of the first tape measure 32 (or an end of a second tape measure 34, or an end of a third tape measure 37 [see FIG. 2], or an end of any other tape measure (not shown)) in position with respect to the tape measure end-securing device 10 and, therefore, also in position with respect to the board 18. The tape measure end-securing device 10 also provides a method for applying, additional force to the end of the tape measure 32, 34, 37 to secure it in position when the end of the tape measure 32, 34, 37 is expected to experience stronger forces attempting to urge it off of the tape measure end-securing device 10 as can occur when especially long measurements are being made. This is described in greater detail hereinafter.

Referring also to FIG. 1, the end of the first tape measure 32 is disposed in a center slot 38. The center slot 38 is located at a first end 12b of the body 12. A second end 12c is disposed on an opposite side of the body 12 as is the first end 12b.

When the tape measure end-securing device 10 is disposed over the edge of the board 18, the center slot 38 aligns with the center of the board 18. When the end of the first tape measure 32 is disposed in the center slot 38, it is easy to extend the first tape measure 32 and take a center to center spacing measurement between boards 18. If desired, the user may also use the center slot 38 to take a measurement from the center of the board 18 (where the end of the first tape measure 32 is disposed) to an inside or outside edge of another board (not shown) or to any other desired location.

The tape measure end-securing device 10 includes a first edge slot 40 and a second edge slot 42 that are disposed on opposite sides of the tape measure end-securing device 10. The first edge slot 40 aligns with a first side 18a of the board 18. The second edge slot 42 aligns with a second side 18b of the board 18. By placing an end of the tape measure 32, 34, 37 in either the first edge slot 40 or in the second edge slot 42, measurements from either side 18a, 18b of the board 18 to any desired location can be easily, quickly, and accurately accomplished.

A first V-edge 44 is disposed at the second end 12c of the body 12 and on the same side of the tape measure end-securing device 10 as the first edge slot 40 so that the first V-edge 44 aligns with the first side 18a of the board 18. A second V-edge 46 is disposed at the second end 12c of the body 12 and on the same side of the tape measure end-securing device 10 as the second edge slot 42 so that the second V-edge 46 aligns with the second side 18b of the board 18. The first and second V-edges 44, 46 extend down the thickness of the body 12. They do not extend below the bottom surface 12a of the body 12.

The first V-edge 44 and the second V-edge 46 are used to measure the longitudinal length of the board 18 or to measure corner to opposite corner of a frame structure, such as foundation forms, to check for right angle corners (i.e., for square). As shown, an end 34a of the second tape measure 34 is placed over the second V-edge 46. The second tape measure 34 is shown being extended at an angle away from the board 18, presumably toward an opposite corner.

Prior to taking such a corner to corner measurement, the tape measure end-securing device 10 would be urged in the direction of arrow 48 until an edge of the straddle member 16 made contact with a perpendicular board 50 at an inside corner 52 of an intersection between the board 18 and the perpendicular board 50. When the tape measure end-securing device 10 was in this position, the second V-edge 46 would align with the inside corner 52. If desired, the tape measure end-securing device 10 is secured to the board 18 by use of the threaded rod 28 and the securing knob 30 or by use of the nail 24a. Therefore, an accurate measurement from the inside corner 52 to an opposite inside corner (not shown) can be made and recorded.

The tape measure end-securing device 10 would then be lifted off of the board 18 and placed over the board 18 at an opposite longitudinal end of the board 18 with the first and second V-edges 44, 46 facing toward an opposite end of the board 18 and with the first V-edge 44 proximate a distal inside corner (not shown) at the opposite end of the board 18. The tape measure end-securing device 10 would be urged in a direction opposite that of arrow 48 until an edge of the straddle member 14 made contact with a second perpendicular board (not shown) that was attached to the opposite end of the board 18 and as close as possible to being parallel with the perpendicular board 50 and perpendicular with respect to the board 18.

The end 34a of the second tape measure 34 would then be placed over the first V-edge 44 and measurement to the opposite corner would be made and recorded. The two measurements would be compared with each other and if they were identical, within acceptable tolerance, the structure would be confirmed as being square. If the structure was not square, further adjustment to the positioning of the boards 18, 50 (and those not shown) would be made and the corner to corner measurement would be repeated. These are difficult measurements to accomplish without benefit of the tape measure end-securing device 10.

If a measurement along the longitudinal length of the board 18 is desired from any given point, for example from a line 54 that is marked across the edge of the board 18 to determine the desired overall longitudinal length of the board 18, the end 34a of the second tape measure 34 is placed over the first or second V-edge 44, 46, extended to where desired, and a second line (not shown) is placed on the board 18 at the desired location. The second tape measure 34 is extended from the first or second V-edge 44, 46 toward the opposite end of the board 18. The second tape measure 34 is, therefore, parallel with respect to the board 18 for this type of measurement.

Typically, the board 18 is cut at the line 54 and it is cut again at the second line to provide the desired overall length for the board 18. Alternately, the second line is used for some other purpose, such as to indicate an attachment location for another board (not shown).

Referring again to FIG. 2, an end of the third tape measure 37 is disposed under the bottom surface 12a atop the board 18. This allows measuring upward from the top surface of the board 18 to any location that is disposed above the board 18. This is a very difficult measurement to accomplish without benefit of the tape measure end-securing device 10.

If desired, one or more side tabs 56, 58, 60, 62, 64, 66 can be included at any preferred location. As shown, all of the side tabs 56-66 are disposed on the same plane as that of an upper surface 18c of the board 18. An outside edge of the side tabs 60, 66 aligns with the first end 12b. Accordingly, if the first end 12b of the tape measure end-securing device 10 is disposed at a desired location along the longitudinal length of the board 18, a measurement taken from the outside edge of side tabs 60, 66 can be used to determine the distance from the desired location to another location on the board 18 or to another board (not shown) or reference point.

An outside edge of the side tabs 56, 62 aligns with the second V-edge 46 and the first V-edge 44, respectively. By positioning the first V-edge 44 or the second V-edge 46 where desired on the board 18 similar measurements can be taken as described above using the outside edges of side tabs 56, 62. Use of the first and second V-edges 44, 46 permit measurements that extend away from the tape measure end-securing device 10 at an angle. Use of the outside edges of side tabs 56, 62 are intended for measurements that are generally parallel with the longitudinal length of the board 18.

The inside side tabs 58, 64, if included, are disposed where desired. If preferred, either edge of the inside side tabs 58, 64 can be set to align with a center threaded shaft 68.

If preferred, an opening 70 can be disposed under any of the side tabs 56-66 to permit viewing of the board 18 and any desired marking that may be present on the first or second sides 18a, 18b of the board. As shown, the side tabs 58, 64 include the opening 70. Therefore, the tape measure end-securing device 10 can be moved in either direction as shown by arrow 20 to align either edge of the side tabs 58, 64 with the desired marking on the first or second sides 18a, 18b.

If preferred, any of the side tabs 56-66 can include a vertical nail hole 25 for securing the tape measure end-securing device 10 in position by attaching the tape measure end-securing device 10 to an adjacent board (not shown) that is disposed adjacent to and in a slightly spaced apart orientation with respect to the board 18.

The plane that each of the side tabs 56-66 is disposed on is perpendicular with respect to the line (i.e., the edge) of either the first V-edge 44 or the second V-edge 46. That means that the plane of a tape portion 32b, 34b, 37b of the tape measure 32, 34, 37 will change by ninety-degrees depending on where the tape-measure end 32a, 34a, 37a is placed. For example, if the tape-measure end 32a, 34a, 37a is placed on top of any of the side tabs 56-66 or on top (i.e., resting on the upper surface of the body 12) of the center slot 38, the first edge slot 40, or the second edge slot 42 then the plane of the tape portions 32b, 34b, 37b will be parallel with respect to each other and parallel with respect to the upper surface 18c of the board 18. If, however, the tape-measure end 32a, 34a, 37a is placed on the first V-edge 44, the second V-edge 46 or from the side in the direction as shown by arrow 72 (FIG. 2) in the center slot 38, the first edge slot 40, of the second edge slot 42 the plane of the tape portions 32b, 34b, 37b will be parallel with respect to each other and perpendicular with respect to the upper surface 18c of the board 18.

This allows great versatility in how measurements are accomplished and further increases the utility of the tape measure end-securing device 10. The tape measure end-securing device 10 is useful regardless of the orientation of the dimension lumber 18, including use with dimension lumber 18 that is vertically or horizontally disposed and regardless of the direction or plane that the desired measurements with respect to the dimension lumber 18 are made.

For example, the dimension lumber 18 may be disposed in a horizontal and planar orientation with the first side 18a and the second side 18b of the boards 18 parallel with respect to the plane of the ground surface and either the first or second side 18a, 18b facing upward. An example of this type of orientation is found when dimension lumber 18 is used to create a walking surface of a deck (not shown). The side tabs 56-66 provide a convenient location for placement of the tape-measure end 32a, 34a, 37a when the tape measure end-securing device 10 is used with boards 18 used to create the surface of the deck.

Also, the tape measure end-securing device 10 can be adapted for use with other sizes and other types of dimension lumber 18. For example, certain types of building material are provided in thicknesses that are less than one-inch thick. Pine boards 18 are commonly available in one-half or three-quarters of an inch thickness. Accordingly, the spacing between the straddle members 14, 16 can be reduced accordingly to approximately one-half or three-quarters of an inch.

Also, synthetic and composite types of building material are commercially available in a variety of thicknesses. For example, synthetic lumber for use as a decking material is commonly available in various thicknesses, lengths, and including a variety of material formulations. Synthetic lumber may be provided in any thickness including those mentioned above as well as more unusual thickness such as, for example, five-eights of an inch thick. Synthetic lumber may also be available in metric sizes (not in inches). In use, synthetic lumber is measured, cut, and fastened in a manner similar to that of conventional (i.e., wood-based) lumber.

Accordingly, the tape measure end-securing device 10 is similarly modified for use with any desired type of synthetic lumber for use as the board 18 by varying the spacing between the straddle members 14, 16 to match the thickness of the board 18.

An important benefit provided by the tape measure end-securing device 10 is its ability to secure the tape-measure end 32a, 34a, 37a at a desired location of the device to facilitate measurements. When short distance measurements are accomplished, the tape-measure end 32a, 34a, 37a can be placed where desired and by grasping and pulling the body of the tape measure 32, 34, 37 the user is able to extend the tape portion 32b, 34b, 37b a desired amount and obtain the necessary measurement. The user then walks back toward the tape-measure end 32a, 34a, 37a while allowing the tape portion 32b, 34b, 37b to retract back into the body of the tape measure 32, 34, 37. The tape-measure end 32a, 34a, 37a is then lifted or urged away from its position of engagement with the tape measure end-securing device 10. When a subsequent measurement is required the tape measure end-securing device 10 is repositioned with respect to the board 18, if required, and the process is repeated.

This allows for rapid accurate measurements to be taken by only one user, without the need for a second person to hold the tape-measure end 32a, 34a, 37a at a desired location. The tape measure end-securing device 10 secures the tape-measure end 32a, 34a, 37a at the desired location. This approach relies on the natural holding ability of the tape measure end-securing device 10 to secure the tape measure end 32a, 34a, 37a in cooperation with the tape measure end-securing device 10. It does not mechanically retain the tape measure end 32a, 34a, 37a to the tape measure end-securing device 10 in a way that positively prevents the tape measure end 32a, 34a, 37a from separating apart from the tape measure end-securing device 10.

The advantage to this method of using of the tape measure end-securing device 10 (i.e., with an unsecured tape measure end 32a, 34a, 37a) is that it allows for the fastest possible taking of measurements using the tape measure end-securing device 10. Accordingly, it is most effective when short to moderate measurement distances are involved. As the physical size (width and thickness) of the tape portion 32a, 34a, 37a varies with different models of the tape measure 32, 34, 37, the maximum effective working distance for an unsecured tape measure end 32a, 34a, 37a can vary from among the different tape measures 32, 34, 37, and also according to the field conditions.

When the end of the tape measure 32, 34, 37 is placed in either the center slot 38, the first edge slot 40, the second edge slot 42, the first V-edge 44, the second V-edge 46, or on any of the side tabs 56-66, the tape measure end 32a, 34a, 37a of the tape measure 32, 34; 37 tends to stay in position. However, if a sufficiently strong-enough force or a force that fluctuates a sufficient amount in its intensity is applied to the tape measure 32, 34, 37 the tape measure end 32*a*, 34*a*, 37*a* can, on occasion, become dislodged from its point of attachment to the tape measure end-securing device 10. These conditions are most likely to occur when long measurement spans (i.e., distances) are involved.

Therefore, an adjustable thumb member, identified in general by the reference numeral 74 (See all three figures) is provided for when it is especially desirable to retain the tape measure end 32*a*, 34*a*, 37*a* in a position of cooperation with the tape measure end-securing device 10. For example, if the user is taking a measurement over a span of nearly one-hundred feet, the user would not want to walk back to the point of origin (of the measurement) because the tape measure end 32*a*, 34*a*, 37*a* had inadvertently become dislodged from its position of cooperation (where it was placed) on the tape measure end-securing device 10.

Referring now primarily to FIG. 3, the thumb member 74 includes a planar longitudinal body 75 that includes a longitudinal slot 76. A first curved end 78 includes a first curved open area 80 and a first inwardly curving member 82. The first inwardly curving member 82 is attached to a first end of the longitudinal, body 75 and is perpendicular with respect to the longitudinal body 75. A second curved end 84 is similar in configuration to the first curved end 78 in that a second curved open area 80*a* and a second inwardly curving member 82*a* provide a similar structure that is disposed on an opposite side of the longitudinal body 75 as compared to the first curved open area 80 and the first inwardly curved member 82. By having the first inwardly curved member 82 and the second inwardly curving member 82*a* disposed on the same longitudinal side of the longitudinal body 75 an optimum configuration is provided for quickly securing the tape measure end 32*a*, 34*a*, 37*a* at the various locations of the tape measure end-securing device 10 without the need to remove the thumb member 74 from the center threaded shaft 68 and reinstall the thumb member 74 over the center threaded shaft 68. Use of the thumb member 74 is described in greater detail hereinafter.

Referring now also to FIG. 1, the thumb member 74 is disposed on the upper (top) surface of the body 12 with the center threaded shaft 68 extending upward and through the slot 76. A lower portion of the center threaded shaft 68 is fixedly-attached to the body 12.

A lower washer 86 (see FIG. 2) is placed over the center threaded shaft 68 and on top of the longitudinal body 75. A coil spring 88 is placed atop the lower washer 86. An upper washer 90 is placed over the top of the coil spring 88. A tensioning knob 92 which includes threads that cooperate with the threads of the center threaded shaft 68 is screwed on the center threaded shaft 68 and over the upper washer 90.

To properly orient and then secure the thumb member 74 in a desired position the tensioning knob 92 is loosened enough so that only slight to moderate pressure (if any) is applied to the longitudinal body 75 of the thumb member 74 by the spring 88. The thumb member 74 is rotated around the center longitudinal axis of the center threaded shaft 68 to dispose the first curved end 78 or the second curved end 84 in radial alignment with respect to the tape measure end 32*a*, 34*a*, 37*a* after the tape measure end 32*a*, 34*a*, 37*a* has been placed in, and is thereby engaged with, a desired receiving location of the tape measure end-securing device 10.

For example, the tape measure end 32*a*, 34*a*, 37*a* may be placed in either the center slot 38, the first edge slot 40, the second edge slot 42, on any of the side tabs 56-66, on the first V-edge 44, the second V-edge 46, or at any other suitable location on the tape measure end-securing device 10. It is also possible that the thumb member 74 may not be designed or suitable for use at some of the possible locations that are provided with certain versions of the tape measure end-securing device 10 for receiving the tape measure end 32*a*, 34*a*, 37*a*.

The thumb member 74 is then urged with respect to the center threaded shaft 68 along the longitudinal slot 76 until the desired first curved end 78 or second curved end (whichever is more appropriately shaped) is in contact with the tape measure end 32*a*, 34*a*, 37*a*. For most situations, the measurement can then be confidently taken by relying on the slight, normal amount of force applied by the spring 88 to the thumb member 74 as sufficient to retain the tape measure end 32*a*, 34*a*, 37*a* at the desired position (i.e., receiving location) where it was placed.

If desired, the tensioning knob 92 can be tightened an additional amount to further compress the spring 88 and thereby better secure the thumb member 74, and therefore better secure the tape measure end 32*a*, 34*a*, 37*a* in the position (or receiving location).

If desired, the tensioning knob 92 may also be tightened an additional amount so as to fully compress the spring 88 and thereby bind the thumb member 74 in position. This would be done when it was desired to positively secure the tape measure end 32*a*, 34*a*, 37*a* to the tape measure end-securing device 10, such as when a critical measurement is being made or when taking the measurement over an especially long distance or span.

However, for most measurements the tape measure end-securing device 10 is simply urged over the edge of the board 18 until the bottom surface 12*a* is in contact with the upper surface 18*c* of the board 18. For measurements that are made from the center or from an edge of the board 18 the user places the tape measure end 32*a*, 34*a*, 37*a* in a desired location (for example in either the center slot 38, the first edge slot 40, or the second edge slot 42) and takes the measurement. For most short to medium distance measurements use of the thumb member 74 to secure the tape measure end 32*a*, 34*a*, 37*a* to the tape measure end-securing device 10 is not necessary.

As briefly mentioned, if it is desired to better ensure that the tape measure end 32*a*, 34*a*, 37*a* will be retained where desired, the thumb member 74 is utilized by rotating it about the center threaded shaft 68 and urging it along the longitudinal slot 76 until either the first curved end 78 or the second curved end 84 is bearing against the respective tape measure end 32*a*, 34*a*, 37*a*. If the force being applied by the spring 88 is deemed to be sufficient the measurement is then taken.

If additional force is desired to further ensure that the tape measure end 32*a*, 34*a*, 37*a* will be retained in its desired position of cooperation with the tape measure end-securing device 10 the tensioning knob 92 is tightened a further amount. If the maximum amount of force is desired to positively retain the tape measure end 32*a*, 34*a*, 37*a* to the tape measure end-securing device 10 the tensioning knob 92 is tightened until the spring 88 is fully compressed and the tensioning knob 92 is tightly secured (i.e., it cannot easily be rotated). This position prevents any possible movement by the thumb member 74 which, accordingly, positively prevents the tape measure end 32*a*, 34*a*, 37*a* from being dislodged from its position of cooperation or engagement with the tape measure end-securing device 10.

After the desired measurement has been obtained, the tensioning knob 92 is loosened and the thumb member 74 is urged away from the tape measure end 32*a*, 34*a*, 37*a* to permit removal of the respective tape measure end 32*a*, 34*a*, 37*a* apart from the tape measure end-securing device 10.

If the desired measurement is to be made from a particular reference location on the board 18, such as for a measurement extending away from the reference location along the longitudinal length of the board 18 or, alternately, for a measurement extending diagonally away from the board 18 to an opposite corner of a structure, after initially placing the tape measure end-securing device 10 on the board 18, the tape measure end-securing device 10 would then urged along the longitudinal length of the board 18 (in either direction) until the desired one of the many possible receiving locations for placement of the tape measure end 32a, 34a, 37a was in alignment with the desired reference location. The desired measurement would then be obtained or, if it was preferred, the thumb member 74 would be used, as previously described.

For any of the above measurements, if it was deemed important to ensure that the position of the tape measure end-securing device 10 with respect to the board 18 was more positively maintained (i.e., ensured) the tape measure end-securing device 10 would be secured to the board 18 by use of the securing knob 30 and threaded rod 28 (which are tightened) or by use of the nail 24a being partially driven into the board 18 through any of the nail holes 24 or vertical nail hole 25. This precaution would most likely be taken when it was believed that in the process of obtaining the desired measurement a sufficient force capable of possibly moving the tape measure end-securing device 10 could be applied to the tape measure end-securing device.

It is important to note that by providing locations for placement and securing of the tape measure end 32a, 34a, 37a in the tape measure end-securing device 10 where each location corresponds with a particular location or position of the board 18, such as aligning with the first side 18a, the second side 18b, the upper surface 18c, an end of the board 18 or with a marking that is placed on the board 18, that a user is able to grasp the body of the tape measure 32, 34, 37 and extend the tape measure 32, 34, 37 to the point where a desired distance measurement is obtained. Because the tape measure end-securing device 10 is able to secure the tape measure end 32a, 34a, 37 with varying degrees of certainty, quick, accurate and repeatable measurements can be accomplished by only one person.

The subjective aspect of where the tape measure end 32a, 34a, 37a should ideally be held is also removed by use of the tape measure end-securing device 10. As previously mentioned, without benefit of the tape measure end-securing device 10 a second person would be necessary to hold the tape measure end 32a, 34a, 37a at a desired location. It is likely when the user was actually taking the desired measurement (especially when taking a measurement over a considerable distance) that the user would increase the amount of force he or she was applying to the body of the tape measure 32, 34, 37 to remove slack and that, as a result of applying the increased force, the tape measure end 32a, 34a, 37a would be momentarily urged away from the desired location, thereby resulting in the attainment of a false or undersize measurement reading.

Accordingly, the tape measure end-securing device 10 also eliminates the possibility of the tape measure end 32a, 34a, 37a being momentarily pulled or urged away from its desired position when the actual measurement is obtained.

Therefore, short measurements as well as long distance measurements taken in any desired direction extending away from the tape measure end-securing device 10 can be accomplished quickly, easily, and with great accuracy. This benefit is provided by the tape measure end-securing device 10 regardless of thickness or the type of building material.

It is important to note that additional receiving locations for the tape measure end-securing device 10 other than those shown and described herein are anticipated for inclusion with different embodiments of the tape measure end-securing device 10. For example, different versions of the tape measure end-securing device 10 are expected to be designed to meet the general needs of general contractors while other versions will be designed to meet the specialized needs of more specialized contractors. For certain applications a greater number of a certain type of receiving location that engages with the tape measure end-securing device 10 in a preferred way will be included with the tape measure end-securing device 10 while for certain other applications a lesser number of certain other types of receiving locations will be required.

For example, the center slot 38 will be important to framing contractors who use their version of the tape measure end-securing device 10 primarily for framing the walls, ceilings and roofs of various structures or buildings. This is because a framing contractor will want to ensure that all wall studs, floor joists, ceiling joists, and roof rafters are installed at the proper center-to-center spacing. Accordingly, they may prefer the inclusion of a second center slot (not shown) on the opposite side of the tape measure end-securing device 10.

However, for craftsmen working with dimension pine lumber that is three-quarters of an inch thick, they may not be as concerned with measuring center-to-center distances. Instead, such a craftsman might be more interested in determining a proper distance from the second side 18b (i.e., from an inside edge) of the board 18 to the inside edge of the next or nearest board (not shown). The first edge slot 40 and the second edge slot 42 would be especially important to this type of craftsman who might, similarly, prefer the inclusion of similar additional edge slots (not shown) that are disposed on the opposite side of the tape measure end-securing device 10.

Accordingly, considerable design flexibility in the number and type of receiving locations (i.e., areas for placement of the tape measure end 32a, 34a, 37a) are possible for different models or for different versions of the tape measure end-securing device 10.

Referring again to FIG. 2 and in particular to the position of the thumb member 74, the first inwardly curving member 82 of the first curved end 78 is bearing against the tape portion 37b that is disposed a short distance above the tape-measure end 37a. Assuming that the tensioning knob 92 had been tightened sufficiently on the threaded shaft 68, the thumb member 74 is able to secure the tape-measure end 37b to the tape measure end-securing device 10.

This example is important because it illustrates some of the versatility of the thumb member 74 in its ability to secure any of the tape-measure ends 32a, 34a, 37a to various receiving locations on the tape measure end-securing device 10. In particular, it illustrates how the tape-measure end 32a, 34a, 37a can be secured to the tape measure end-securing device 10 without the thumb member 74 having to make contact directly with the tape-measure end 32a, 34a, 37a.

In general, the position of the thumb member 74 can be adjusted (after loosening of the tensioning knob 92, if the tensioning knob 92 is so tight as to prevent or excessively hinder movement of the thumb member 74) by rotating the thumb member 74 radially around the threaded shaft 68 and by then urging the thumb member 74 longitudinally along the slot 76, as desired.

For some possible placement locations for the tape-measure end 32a, 34a, 37a the first inwardly curving member 82 and second inwardly curving member 84 need not be involved to adequately secure the tape-measure end 32a, 34a, 37a.

Instead, use of the longitudinal body 75 may be all that is needed to positively secure the tape-measure end 32a in certain desired positions.

Prior to illustrating such a position it is important to remember that there are numerous possible locations for placement (i.e., possible receiving locations) of any of the tape-measure ends 32a, 34a, 37a on the tape measure end-securing device 10 that are not mentioned herein. As discussed, other receiving locations may be added to the tape measure end-securing device 10. Also, during use the user may discover that certain other areas of the tape measure end-securing device 10as are useful as receiving locations for the tape-measure ends 32a, 34a, 37a.

For example, the user may find it useful to place the tape-measure end 32a, 34a, 37a across the top of the body 12 and adjacent to any desired location along the upper perimeter edge of the body 12 as a possible starting point for a measurement. For such measurements, the downward force supplied to the tape portion 32b, 34b, 37b by the longitudinal body 75 is likely more than sufficient to retain the tape-measure end 32a, 34a, 37a in the desire position without the need for any additional assistance from the first inwardly curving member 82 or from the second inwardly curving member 84.

Without need (in certain situations) to displace the thumb member 74 longitudinally to ensure that the first inwardly curving member 82 or the second inwardly curving member 84 will engage with the tape-measure end 32a, 34a, 37a the user need only rotate the thumb member 74 about the threaded shaft 68 so that a portion of the longitudinal body 75 will be disposed over at least some of the tape portion 32b, 34b, 37b, thereby securing the tape-measure end 32a, 34a, 37a in the desired position on top of the body 12 of the tape measure end-securing device 10. This allows for even faster measurements to be taken. Preferably, the thumb member 74 is rotated to ensure that some of the longitudinal body 75 that is disposed over the tape portion 32b, 34b, 37b is as close to the tape-measure end 32a, 34a, 37a, as possible. This further helps to reduce the possibility of the tape-measure end 32a, 34a, 37a from rising up and off of the body 12 when the measurement is being taken.

The orientation of the tape measure 37 as shown in FIG. 2 illustrates how the tape measure end-securing device 10 facilitates the taking of a quick and accurate measurement that extends vertically upward from the upper surface 18c of the board 18 to a desired point that is disposed above the upper surface 18c of the board 18.

Looking now at the opposite end of the thumb member 74 it is observed that the second inwardly curving member 82a of the second curved end 84 nearly aligns with the first V-edge 44. If the tape-measure end 37a were placed at the first V-edge 44 (when taking a corner-to-corner measurement, for example) the tensioning knob 92 would be loosened enough to permit a slight radial movement of the thumb member 74 to occur around the threaded shaft 68 sufficient to dispose the second inwardly curving member 82a in radial alignment with respect to the first V-edge 44.

The user would then push or pull the thumb member 74 to longitudinally displace the thumb member 74 with respect to the threaded shaft 68 until the second inwardly curving member 82a was bearing against the tape-measure end 37a. The tape-measure end 37a would, in turn, be bearing against the first V-edge 44. The tensioning knob 92 would be tightened a sufficient amount to ensure that the second inwardly curving member 82a (of the thumb member 74) did not move when the user was obtaining the desired measurement.

In this way the second curved end 84 effectively retains the tape-measure end 37a against the first V-edge 44 thereby permitting the user to obtain the desired measurement quickly, accurately, and without assistance.

Of course, the desired position of the first V-edge 44 with respect to the board 18 must be properly set before taking the measurement. This, as previously discussed, is accomplished by longitudinally urging and then securing, if desired, the tape measure end-securing device 10 to the board 18. The tape measure end-securing device 10 is longitudinally displaced with respect to the board 18 until the first V-edge 44 is in vertical alignment with the desired starting point (of the measurement) on the board 18.

If, however, the user wishes to obtain a corner to corner measurement beginning from the opposite side of the tape measure end-securing device 10 the tape-measure end 37a is instead placed on the second V-shaped edge 46. The position of the thumb member 74 is adjusted similar to that previously described except the first inwardly curving member 82 is used, instead of the second inwardly curving member 84, to secure the tape-measure end 32a to the second V-shaped edge 46. This is because the first inwardly curving member 82 extends in an opposite direction as compared to the second inwardly curving member 84 with respect to a center longitudinal axis of the thumb member 74.

Accordingly, the thumb member 74 provides the important unexpected benefit of securing the tape-measure end 32a, 34a, 37a to numerous receiving locations of the tape measure end-securing device 10 without any need to unscrew and remove the tensioning knob 92, the upper washer 90, the coil spring 88, the lower washer 86, and the thumb member 74 from the threaded shaft 68, invert and then place the thumb member 74 back over the threaded shaft 68 or install a modified thumb member (not shown) over the threaded shaft 68 that includes a different shape or configuration, and then in proper sequence reinstall all of the removed components that had been earlier removed on the threaded shaft 68.

The straddle members 14, 16 provide a first means for securing the tape measure end-securing device 10 in a desired position with respect to the board 18.

If desired, an adjustable clamp assembly (not shown) can be attached to the body 12 to provide a modified tape-measure end-securing device (not shown) that is suitable for use with different thickness sizes of dimension lumber 18. The adjustable clamp assembly includes a pair of opposite planar straddle sides (not shown) that resemble the straddle members 14, 16, except the straddle sides are each cooperatively attached to a threaded interconnecting screw by including a hole through each straddle side with internal screw threads that cooperate with the machine-screw threads of the threaded interconnecting screw. The threaded interconnecting screw extends longitudinally through each of the straddle sides. The straddle sides are normally disposed in a parallel and spaced-apart relationship with respect to each other an amount sufficient to permit the straddle sides to snugly straddle (i.e., fit over) the first side 18a and the second side 18b of the board 18, thereby effectively securing the modified tape-measure end-securing device to the board 18, where desired.

The threaded interconnecting screw is supported by a bracket or by a pair of brackets that extend below a body of the modified tape-measure end-securing device. The brackets permit rotation of the threaded interconnecting screw to occur about a center longitudinal axis of the threaded interconnecting screw; however, the brackets prevent any motion of the threaded interconnecting screw from occurring along a longitudinal length of the threaded interconnecting screw with respect to the modified tape-measure end-securing device. In this way side-to-side or longitudinal movement of the threaded interconnecting screw is prevented from occurring.

By rotating the threaded interconnecting screw in a first direction each of the straddle sides is urged an equal amount inward toward a center of the body 12. By rotating the threaded interconnecting screw in an opposite second direction each of the straddle sides would be urged outward and away from the center of the body 12 the same, equal amount. Therefore, the center of the body 12 (i.e., across the thickness of the board 18) is always disposed midway between the two straddles sides, regardless of the spacing between the straddle sides and the straddles sides are always maintained parallel with respect to each other. If desired, such as for storage, the threaded interconnecting screw could be rotated in the first direction an amount sufficient to urge the two straddle sides inward until they were in contact with each other; however, this position is not suited for use of the modified tape-measure end-securing device with the board 18.

By ensuring that the center of the modified tape-measure end-securing device is always disposed midway between the straddle sides regardless of their spacing, it is possible to use the center slot 38 of the modified tape-measure end-securing device when taking center-to-center measurements, regardless of the thickness of the board 18.

The threaded interconnecting screw is turned in either direction to adjust the spacing between the straddle sides and allow use of the modified tape-measure end-securing device with a variety of different types of the dimension lumber 18 that include a range of thicknesses.

Additional openings are, preferably, provided through the straddle sides to permit one or more alignment rods to pass through and assist in the inward and outward displacement of the straddle sides. The threaded interconnecting screw preferably includes an opposite machine-screw thread pitch along each half of it longitudinal length. This permits each of the straddle sides to move in an opposite direction with respect to the other straddle side as the threaded interconnecting screw is rotated in either direction.

Accordingly, the straddle sides provide a second means for securing the modified version of the tape-measure end-securing device 10 in a desired position with respect to the board 18.

Other changes, improvements, or additions are also possible. For example if desired, gussets (not shown) could be added to provide increased strength for the straddle members 14, 16, including an increase in the force that is exerted by the straddle members 14, 16 upon the board 18, thereby better securing the tape measure end-securing device 10 to the board 18. If desired, one or more gussets are included that extend downward from the body 12 and along an exterior portion of the straddle members 14, 16.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A tape measure end-securing device for use in taking a measurement with a tape measure, the measurement being made relative to a mark, position, surface, edge, or end of a building material, comprising:
    (a) a body;
    (b) at least one location on said body for receiving an end of the tape measure; and
    (c) means for securing said device across a thickness dimension of the building material and in a desired position with respect to the mark, position, surface, edge, or end of the building material.

2. The tape measure end-securing device of claim 1 wherein said means for securing said device includes a pair of substantially planar straddle members that are each attached at one end thereof to said body and wherein said pair of straddle members are disposed in a spaced-apart relationship with respect to each other.

3. The tape measure end-securing device of claim 2 wherein a distance between said pair of straddle members is equal to a dimension of the building material.

4. The tape measure end-securing device of claim 2 wherein a distance between said pair of straddle members is equal to a thickness of the building material.

5. The tape measure end-securing device of claim 1 wherein said means for securing said device includes means for detachably-attaching said tape measure end-securing device to the building material.

6. The tape measure end-securing device of claim 1 wherein said means for securing said device includes at least one nail hole provided in said tape measure end-securing device, wherein said nail hole is disposed over said building material when said tape measure end-securing device is cooperatively engaged with the building material, and wherein said nail hole is adapted to permit the insertion of a nail or other fastener through said nail hole and into the building material sufficient to secure said tape measure end-securing device to the building material.

7. The tape measure end-securing device of claim 1 wherein said means for securing said device includes a threaded rod that is cooperatively engaged with corresponding threads that are provided in an opening through a portion of said device, whereby a tightening of said threaded rod causes an end of said threaded rod to bear against the building material sufficient to retain said device to the building material when said tape measure end-securing device is cooperatively engaged with the building material.

8. The tape measure end-securing device of claim 1 wherein said means for securing said device includes at least one friction increasing member that is attached to said device, and wherein said friction increasing member is in contact with the building material when said tape measure end-securing device is cooperatively engaged with the building material.

9. The tape measure end-securing device of claim 1 wherein said at least one location on said body for receiving an end of the tape measure includes a slot provided in said body, and wherein said slot corresponds with either the mark, position, surface, edge, or end of the building material.

10. The tape measure end-securing device of claim 1 wherein said at least one location on said body for receiving an end of the tape measure includes a side tab that is attached to said body and wherein said side tab extends in a predetermined direction from said body, and wherein said side tab corresponds with either the mark, position, surface, edge, or end of the building material.

11. The tape measure end-securing device of claim 1 wherein said at least one location on said body for receiving an end of the tape measure includes a V-shaped edge that is provided in said body, and wherein said V-shaped edge corresponds with either the mark, position, surface, edge, or end of the building material.

12. The tape measure end-securing device of claim 1 including at least one opening through said device, wherein said opening is disposed over the building material when said tape measure end-securing device is cooperatively engaged with the building material, and wherein said opening permits viewing there-through of a portion of the building material that is disposed under said opening.

13. The tape measure end-securing device of claim 1 including means for securing the end of the tape measure to said at least one location on said body for receiving an end of the tape measure.

14. The tape measure end-securing device of claim 13 wherein said means for securing the end of the tape measure includes a thumb member, and wherein a position of said thumb member is adjustable with respect to said body to bear against the end of the tape measure or to bear against a portion of a tape portion of the tape measure sufficient to secure the end of the tape measure to said body.

15. The tape measure end-securing device of claim 14 including a shaft that is attached at a lower end thereof to said body, and wherein an exposed upper portion of said shaft extends away from said body, and wherein said upper portion includes screw threads, and wherein said thumb member includes a substantially planar body that extends in a longitudinal direction, and wherein said planar body includes a longitudinal slot that extends along a portion of a longitudinal length of said planar body, and wherein said longitudinal slot of said thumb member is able to be disposed over said shaft, and wherein a radial position and a longitudinal position of said thumb member is adjustable with respect to said shaft sufficient to permit placement of a portion of said thumb member on the end of the tape measure or on the tape portion of the tape member, and wherein a sufficient force is applied by said portion of said thumb member to the end of the tape measure or to the tape portion of the tape member to secure the end of the tape measure to the body of the device.

16. The tape measure end-securing device of claim 15 including a lower washer that is disposed on said shaft and on an upper surface of said body of said thumb member, and a coil spring disposed on said shaft, wherein a lower end of said coil spring is disposed on an upper surface of said lower washer, and an upper washer disposed on said shaft wherein a lower surface of said upper washer is disposed on an opposite upper end of said coil spring, and a tensioning knob disposed on said shaft, wherein said tensioning knob includes a threaded opening that includes inside screw threads that cooperate with the screw threads of said shaft, and wherein a lower surface of said tensioning knob is disposed on an upper surface of said upper washer, and whereby a progressive tightening of said tensioning knob results in a corresponding increase in an amount of compression of said coil spring and in a corresponding increase in the amount of force applied by said thumb member to the end of the tape measure or to the tape portion of the tape measure.

17. A tape measure end-securing device for use in taking a measurement with a tape measure, the measurement being made relative to a mark, position, surface, edge, or end of a building material, comprising:
(a) a body;
(b) at least one location on said body for receiving an end of the tape measure;
(c) means for securing said device across a thickness dimension of the building material and in a desired position with respect to the mark, position, surface, edge, or end of the building material; and
(d) means for securing the end of the tape measure to said at least one location on said body for receiving an end of the tape measure, and wherein said means for securing the end of the tape measure includes a thumb member, and wherein a position of said thumb member is adjustable with respect to said body to bear against the end of the tape measure or to bear against a portion of a tape portion of the tape measure sufficient to secure the end of the tape measure to said body, and a shaft that is attached at a lower end thereof to said body, and wherein an exposed upper portion of said shaft extends away from said body, and wherein said upper portion includes screw threads, and wherein said thumb member includes a substantially planar body that extends in a longitudinal direction, and wherein said planar body includes a longitudinal slot that extends along a portion of a longitudinal length of said planar body, and wherein said longitudinal slot of said thumb member is able to be disposed over said shaft, and wherein a radial position and a longitudinal position of said thumb member is adjustable with respect to said shaft sufficient to permit placement of a portion of said thumb member on the end of the tape measure or on the tape portion of the tape member, and wherein a sufficient force is applied by said portion of said thumb member to the end of the tape measure or to the tape portion of the tape member to secure the end of the tape measure to the body of the device, and a lower washer that is disposed on said shaft and on an upper surface of said body of said thumb member, and a coil spring disposed on said shaft, wherein a lower end of said coil spring is disposed on an upper surface of said lower washer, and an upper washer disposed on said shaft wherein a lower surface of said upper washer is disposed on an opposite upper end of said coil spring, and a tensioning knob disposed on said shaft, wherein said tensioning knob includes a threaded opening that includes inside screw threads that cooperate with the screw threads of said shaft, and wherein a lower surface of said tensioning knob is disposed on an upper surface of said upper washer, and whereby a progressive tightening of said tensioning knob results in a corresponding increase in an amount of compression of said coil spring and in a corresponding increase in the amount of force applied by said thumb member to the end of the tape measure or to the tape portion of the tape measure.

* * * * *